United States Patent
Brown

(10) Patent No.: US 11,628,948 B2
(45) Date of Patent: Apr. 18, 2023

(54) AIRCRAFT FUEL ICE CAPTURING FILTER HOUSING, AIRCRAFT FUEL ICE CAPTURING FILTER DEVICE, AND METHOD OF USE

(71) Applicant: Pall Corporation, Port Washington, NY (US)

(72) Inventor: Nicholas W. Brown, New Port Richey, FL (US)

(73) Assignee: Pall Corporation, Port Washington, NY (US)

( * ) Notice: Subject to any disclaimer, the term of this patent is extended or adjusted under 35 U.S.C. 154(b) by 386 days.

(21) Appl. No.: 16/906,595

(22) Filed: Jun. 19, 2020

(65) Prior Publication Data

US 2021/0394918 A1    Dec. 23, 2021

(51) Int. Cl.
     *B64D 37/34*      (2006.01)
     *B01D 21/26*      (2006.01)

(52) U.S. Cl.
     CPC .......... *B64D 37/34* (2013.01); *B01D 21/267* (2013.01); *B01D 2257/80* (2013.01)

(58) Field of Classification Search
     CPC ... B64D 37/34; B01D 21/267; B01D 2257/80
     See application file for complete search history.

(56) References Cited

U.S. PATENT DOCUMENTS

| | | | |
|---|---|---|---|
| 3,718,258 A | 2/1973 | Sharpe | |
| 6,440,317 B1 * | 8/2002 | Koethe | B64F 1/28 123/541 |
| 6,874,641 B2 * | 4/2005 | Clary | B01D 29/6446 134/152 |
| 8,221,633 B2 | 7/2012 | Lam | |
| 8,524,318 B2 | 9/2013 | Betting et al. | |
| 8,590,309 B2 | 11/2013 | Paradise | |
| 8,651,926 B2 | 2/2014 | Gundlach | |
| 8,876,056 B2 * | 11/2014 | Lam | B64D 37/32 244/135 R |
| 9,782,702 B2 | 10/2017 | Carrion | |
| 10,286,408 B2 | 5/2019 | Lam et al. | |
| 2012/0312022 A1 | 12/2012 | Lam et al. | |
| 2013/0055723 A1 | 3/2013 | Paradise | |
| 2013/0068704 A1 | 3/2013 | Hagshenas | |
| 2015/0336037 A1 | 11/2015 | Fausett | |
| 2016/0339453 A1 | 11/2016 | Lam et al. | |

FOREIGN PATENT DOCUMENTS

| | | |
|---|---|---|
| CN | 103977617 A | 8/2014 |
| CN | 208641964 U | 3/2019 |
| GB | 660863 A | 11/1951 |
| JP | 2015-231616 A | 12/2015 |

OTHER PUBLICATIONS

Japanese Patent Office, Office Action issued in counterpart Japanese Patent Application No. 2021-080386, dated Apr. 26, 2022.

* cited by examiner

*Primary Examiner* — Youngsul Jeong
(74) *Attorney, Agent, or Firm* — Leydig, Voit & Mayer, Ltd.

(57) ABSTRACT

Aircraft fuel ice capturing filter device housings, aircraft fuel ice capturing filter devices, and methods of use are provided.

6 Claims, 11 Drawing Sheets

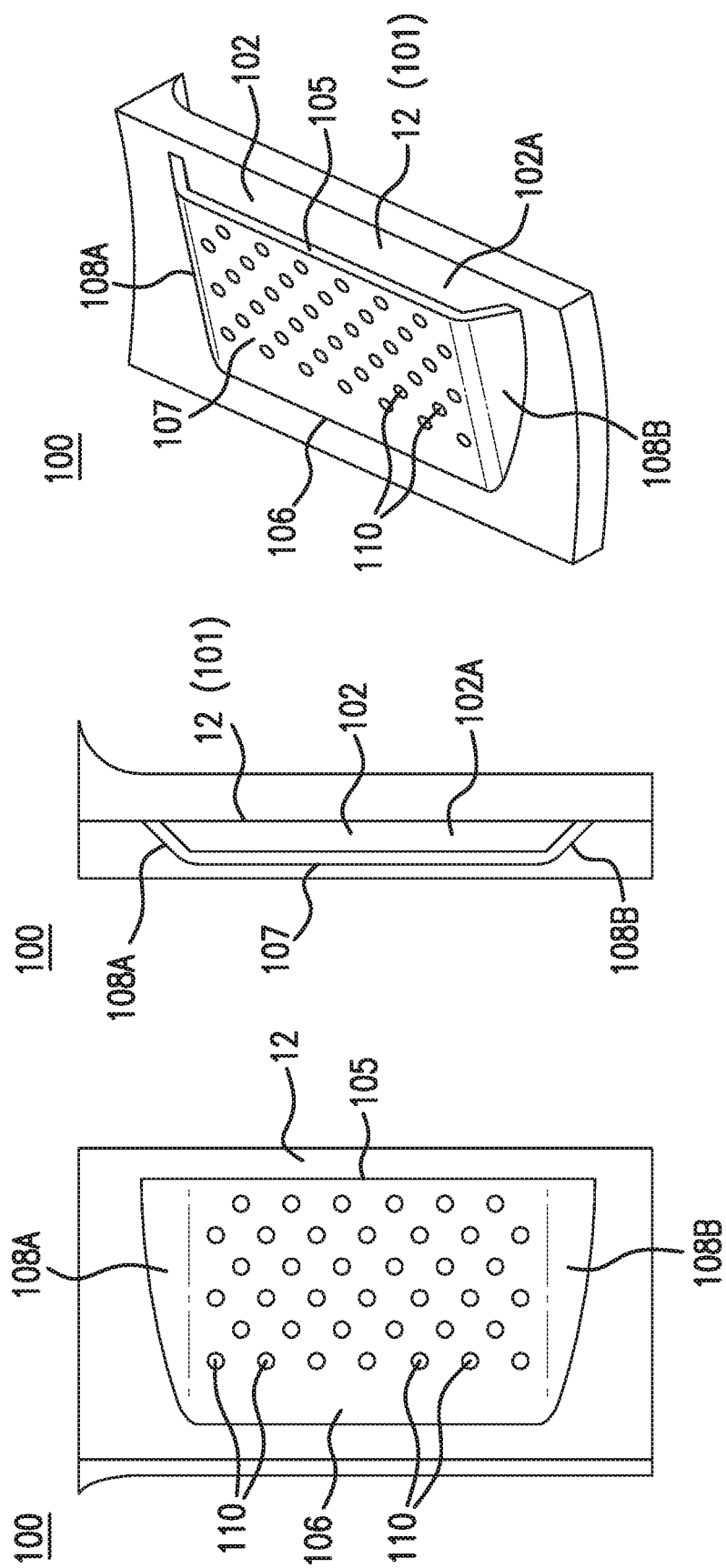

Figure 1A:
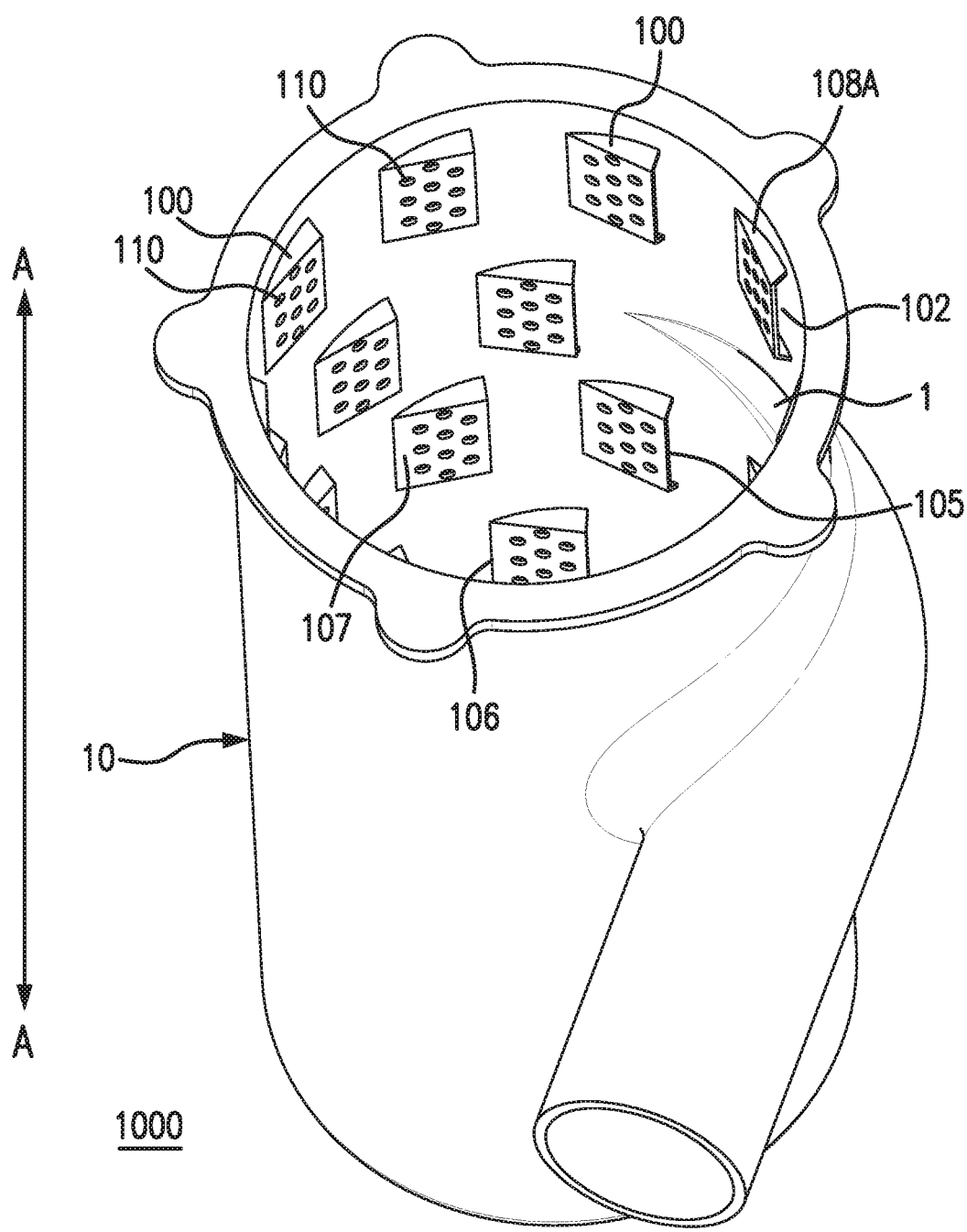

AIRCRAFT FUEL ICE CAPTURING FILTER HOUSING, AIRCRAFT FUEL ICE CAPTURING FILTER DEVICE, AND METHOD OF USE

BACKGROUND OF THE INVENTION

Ice can be present in aircraft fuel, e.g., when moisture accumulates in an aircraft fuel tank and the moisture freezes into ice when the tank is exposed to cold conditions, for example, when the aircraft is flying at altitude. In some cases, the amount of ice (e.g., ice crystals) in the fuel can impact flow of the fuel through the aircraft fuel-oil heat exchanger and/or the aircraft fuel filter, interrupting or adversely affecting performance of the aircraft engine.

There is a need for improved fuel filter devices for removing ice from aircraft fuel.

The present invention provides for ameliorating at least some of the disadvantages of the prior art. These and other advantages of the present invention will be apparent from the description as set forth below.

BRIEF SUMMARY OF THE INVENTION

An embodiment of the invention provides an aircraft fuel ice capturing filter device housing comprising (a) an aircraft fuel inlet; (b) an aircraft fuel outlet; and (c) a main housing body receiving a flow of aircraft fuel from the aircraft fuel inlet, the main housing body comprising a cylindrical element having a central cavity, an inner surface, an outer surface, and a vertical axis; the cylindrical element having a plurality of spaced-apart ice filters on the inner surface, each of the plurality of spaced-apart ice filters having a front end, a rear end, a top wall, a first side, and a second side, and a plurality of apertures passing through the top wall, wherein the top wall at the front end of each of the plurality of spaced-apart ice filters is raised a distance from the inner surface, forming an opening arranged normal to aircraft fuel flow; wherein the aircraft fuel inlet is arranged generally perpendicular to the vertical axis of the cylindrical element and is configured to provide tangential aircraft fuel flow around the cylindrical element; and, wherein the cylindrical element is configured to receive an aircraft fuel filter comprising a porous element.

An aircraft fuel ice capturing filter device according to an embodiment of the invention comprises an embodiment of the aircraft fuel ice capturing filter device housing, wherein the aircraft fuel inlet and the aircraft fuel outlet define a fluid flow path though the aircraft fuel ice capturing filter device housing, and the aircraft fuel ice capturing filter device further comprises an aircraft fuel filter comprising a porous aircraft fuel filter element arranged in the housing across the fluid flow path.

In accordance with another embodiment of the invention, a method for filtering aircraft fuel is provided, the method comprising passing aircraft fuel through an embodiment of the aircraft fuel ice capturing filter device, wherein a portion of the aircraft fuel passes through the apertures of the plurality of spaced-apart ice-capturing filters.

In a preferred embodiment of the method, the aircraft fuel includes ice, and the method includes capturing ice in the plurality of spaced-apart ice-capturing filters.

BRIEF DESCRIPTION OF THE SEVERAL VIEWS OF THE DRAWING(S)

Figure 1B:
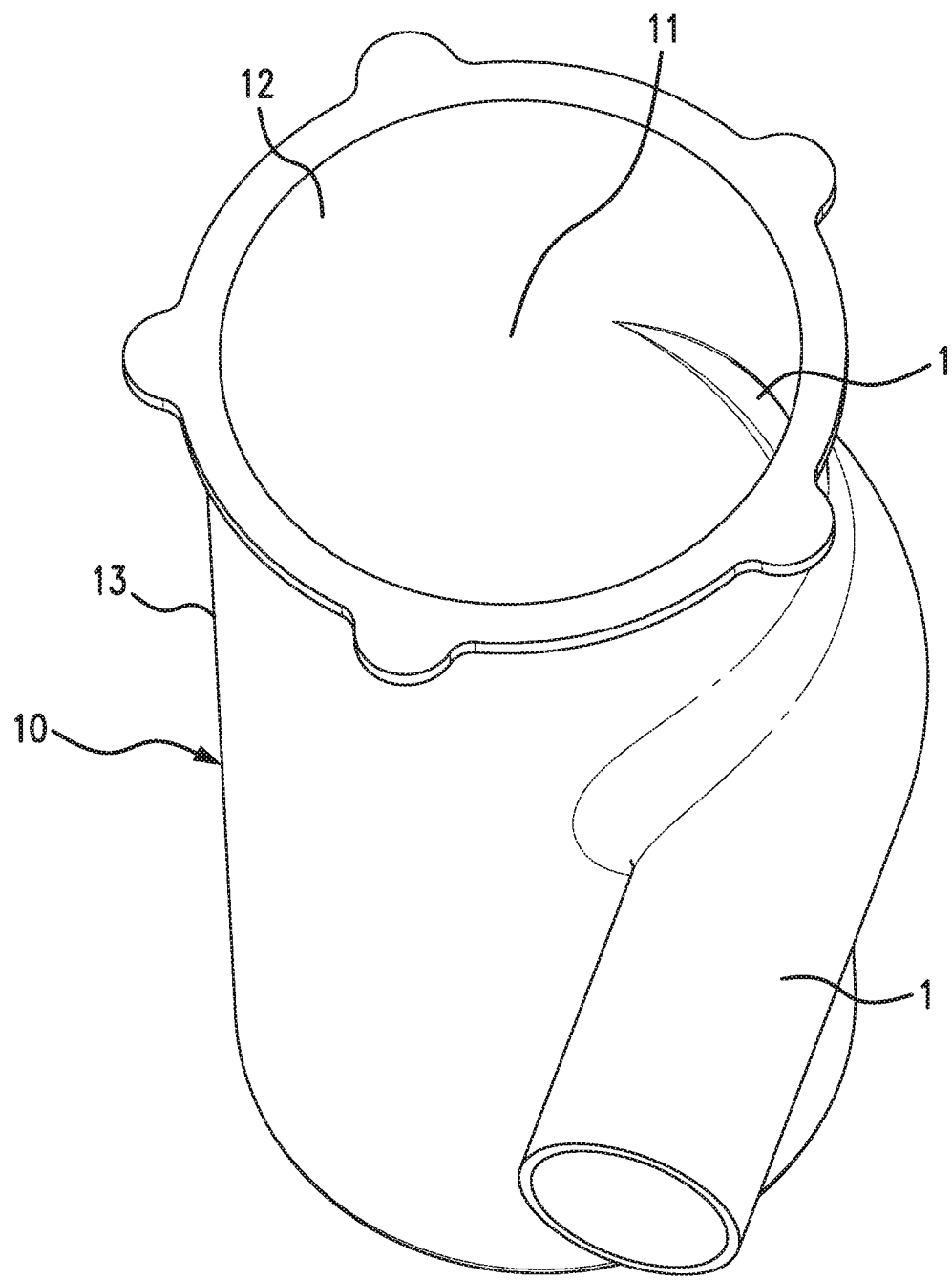
Figure 1C:
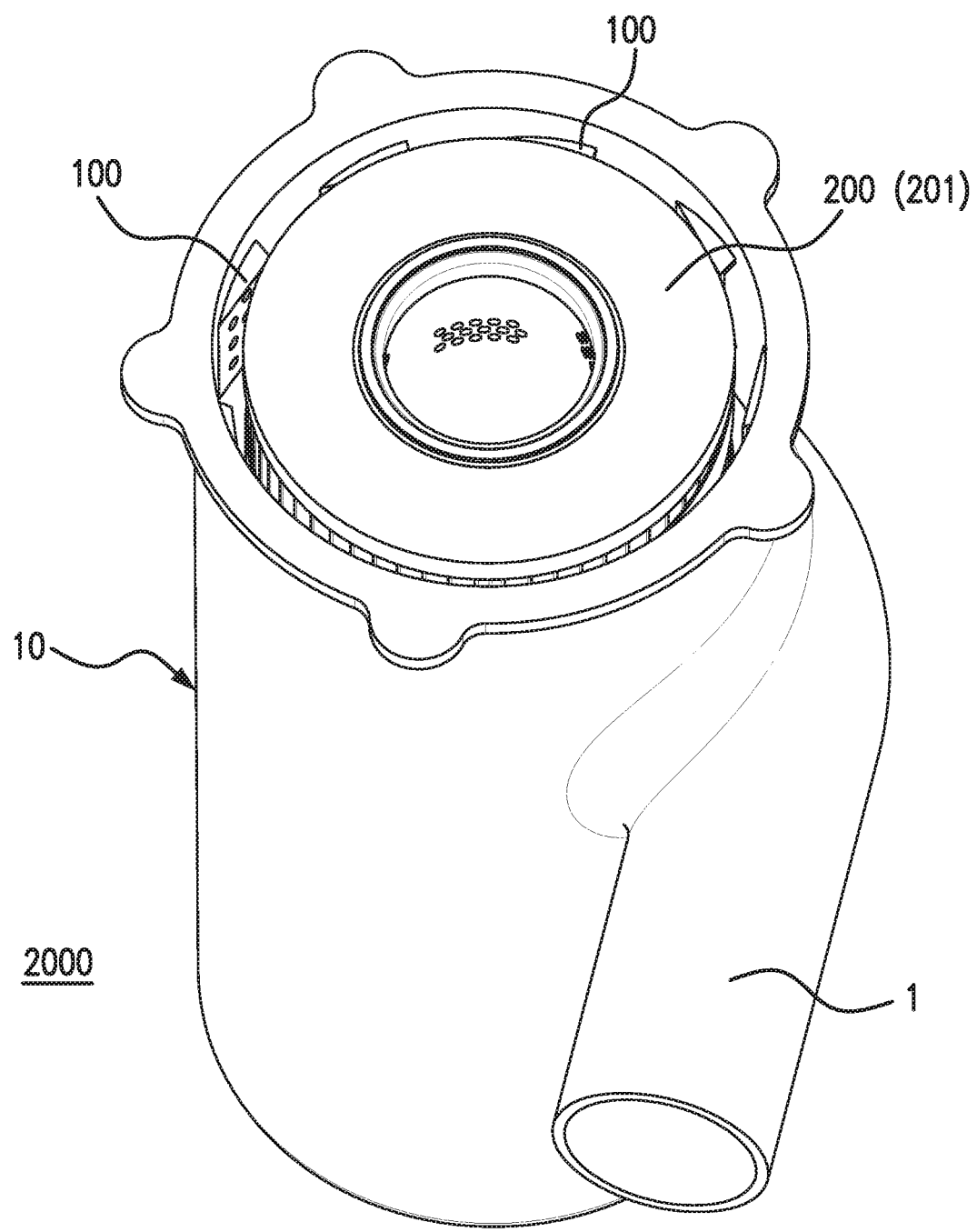

FIG. 1A is a top isometric view of an illustrative aircraft fuel ice capturing device housing body (wherein the top cover has been removed) including an aircraft fuel inlet and a plurality of spaced-apart ice-capturing filters according to an embodiment of the invention, also showing a cutout in the cylindrical element for aircraft fuel inlet flow; FIG. 1B is a top isometric view of an illustrative aircraft fuel ice capturing device housing body without the ice-capturing filters; and FIG. 1C is a top isometric view of an illustrative aircraft fuel ice capturing device housing body of FIG. 1A, also including an aircraft fuel filter.

FIGS. 2A-2C are views of an individual ice filter according to an embodiment of the invention. FIG. 2A shows a top view; FIG. 2B is a front view; and FIG. 2C is an isometric view.

Figure 3A:
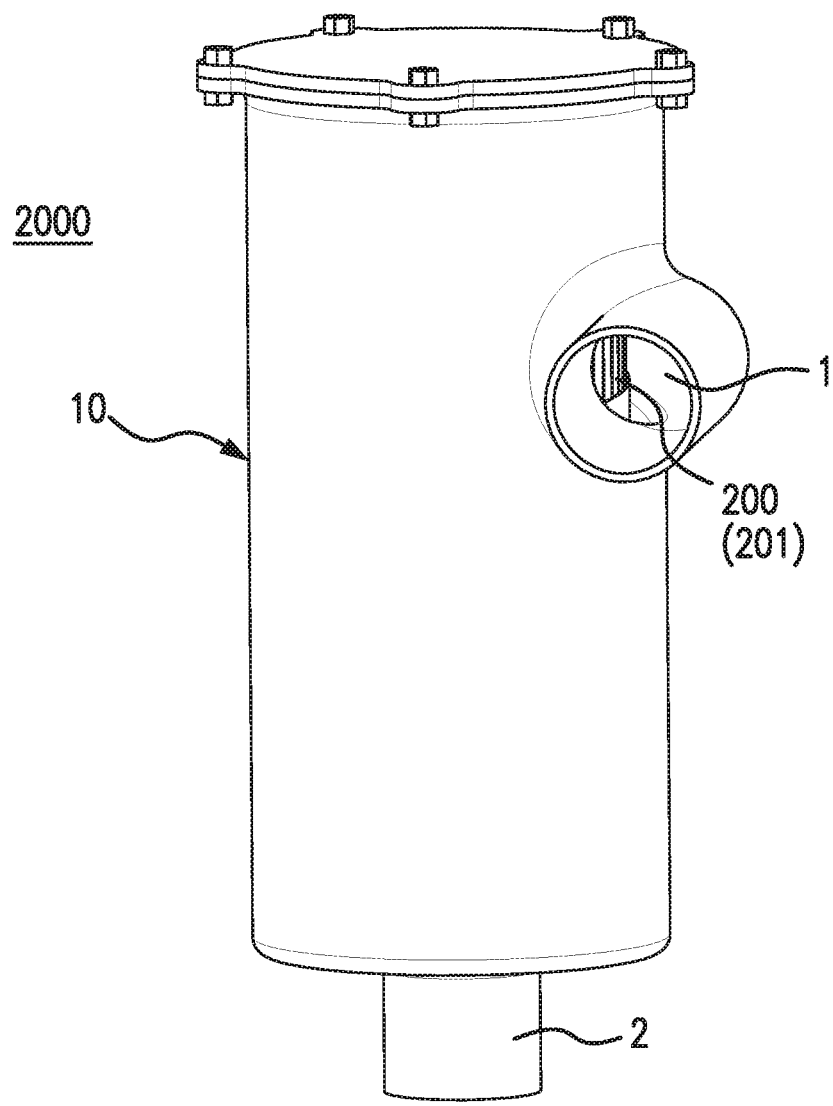
Figure 3B:
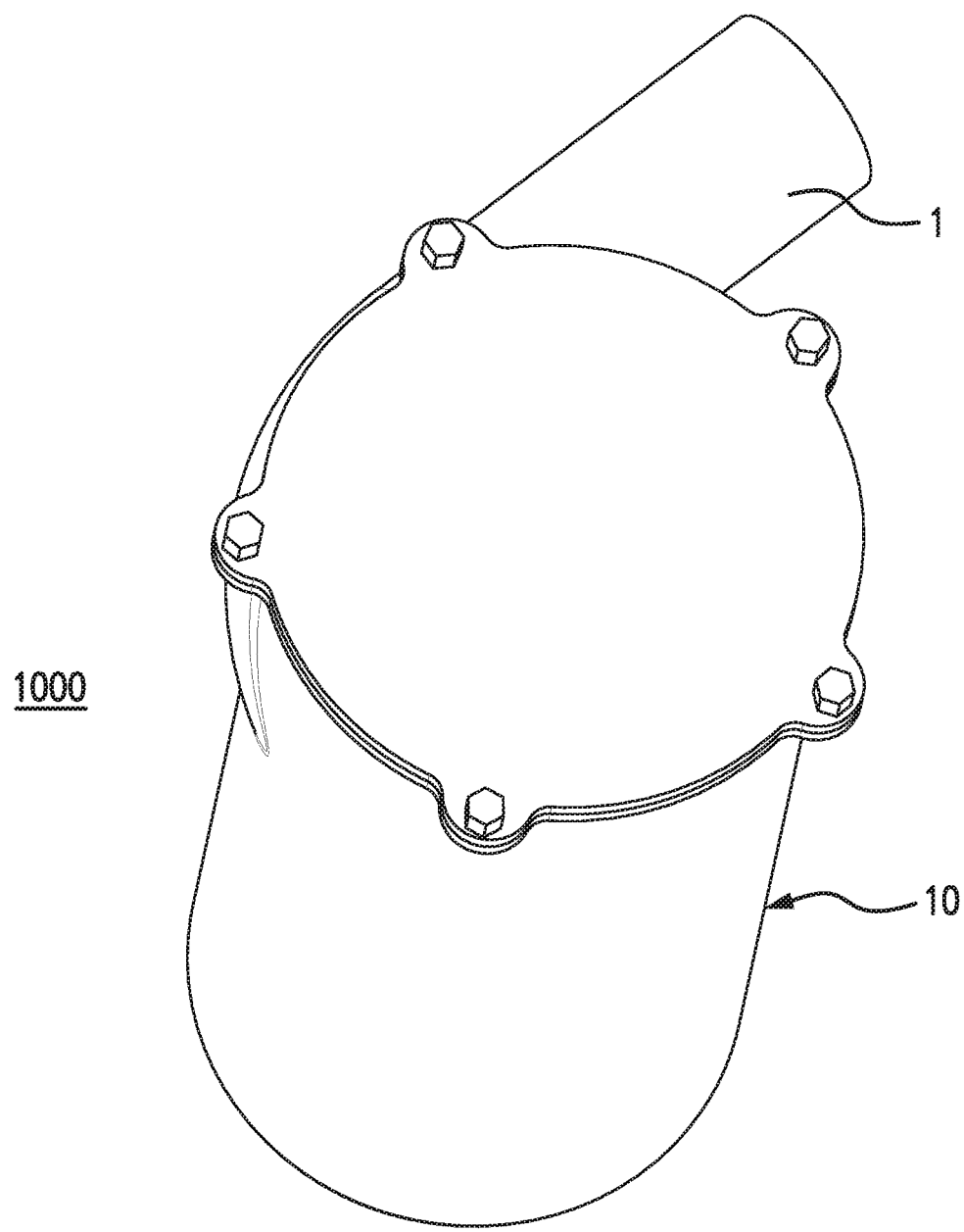
Figure 3C:
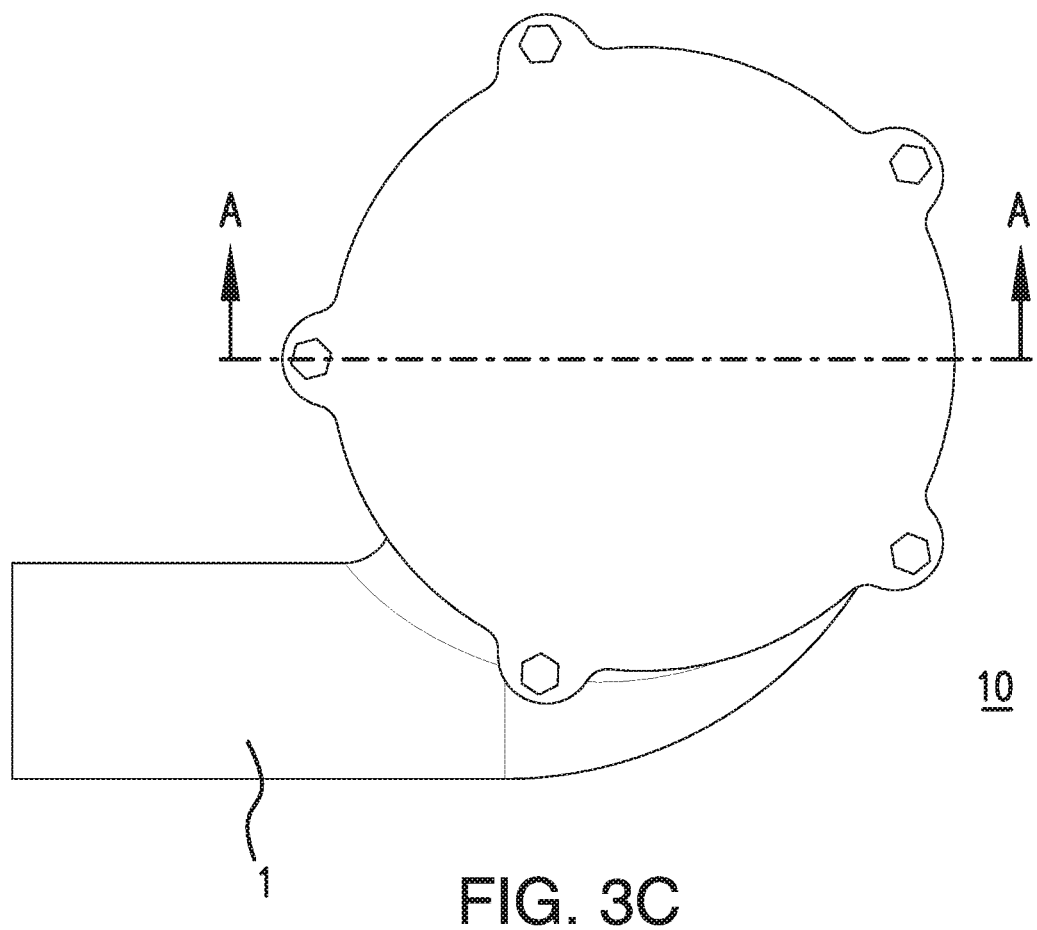
Figure 3E:
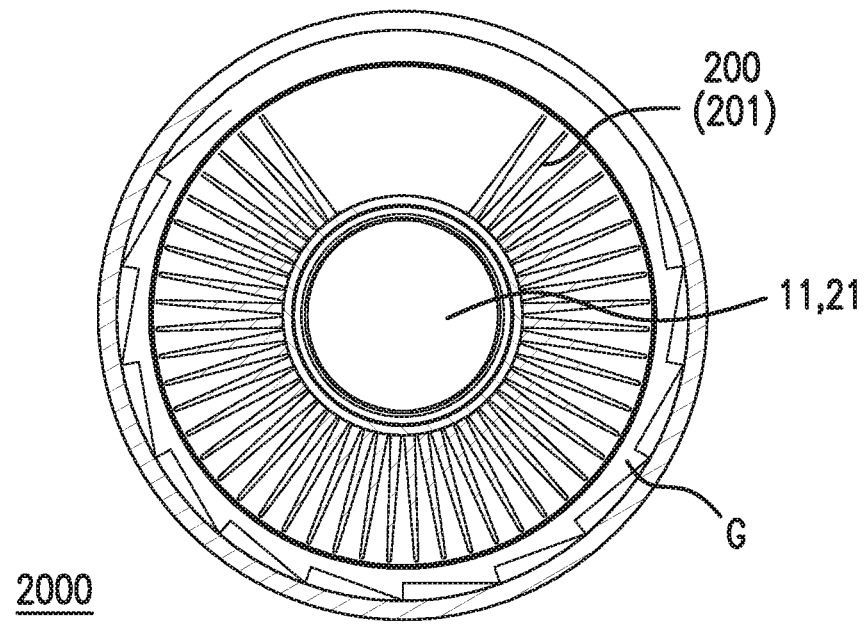
Figure 3D:
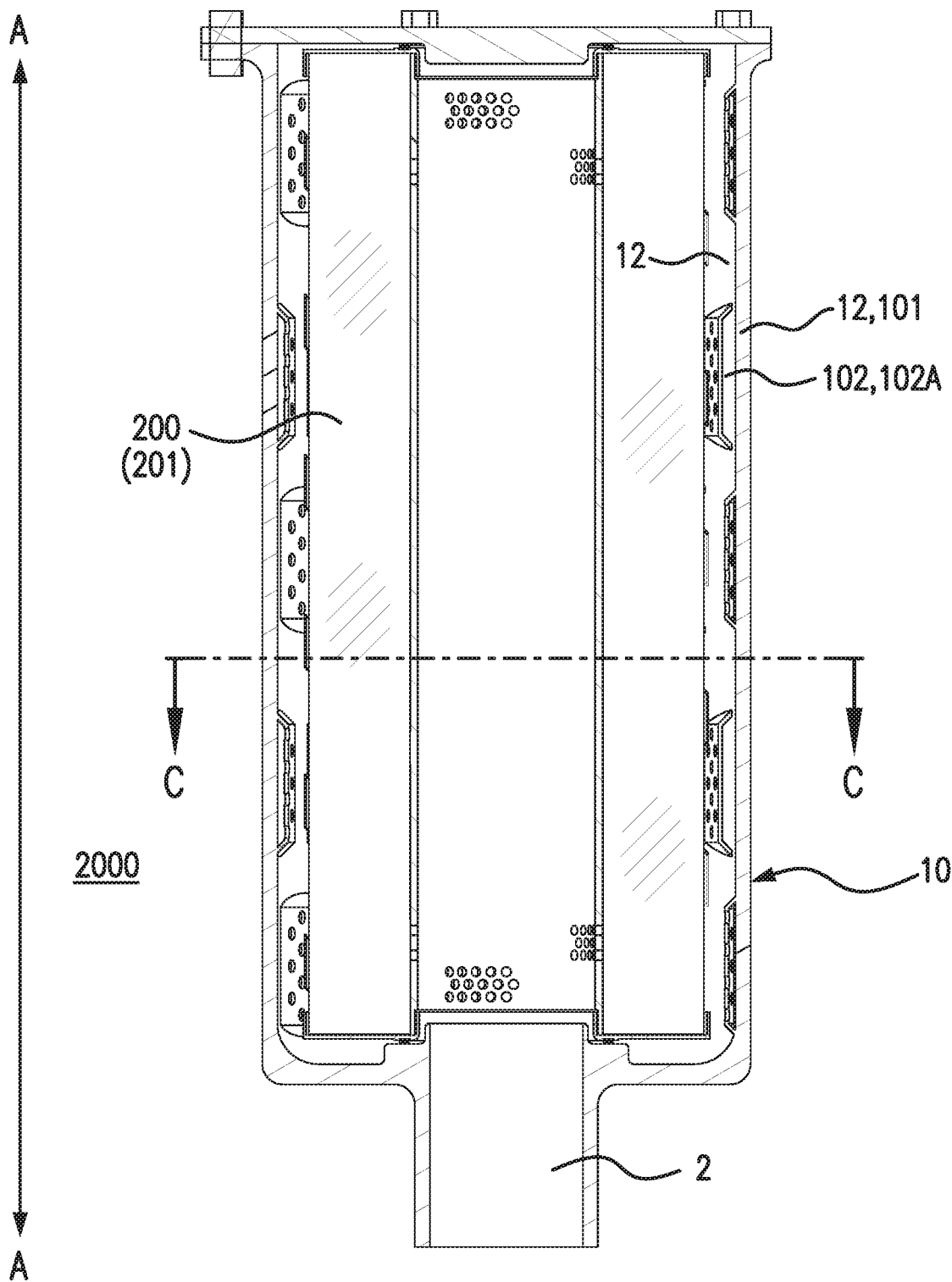
Figure 3F:
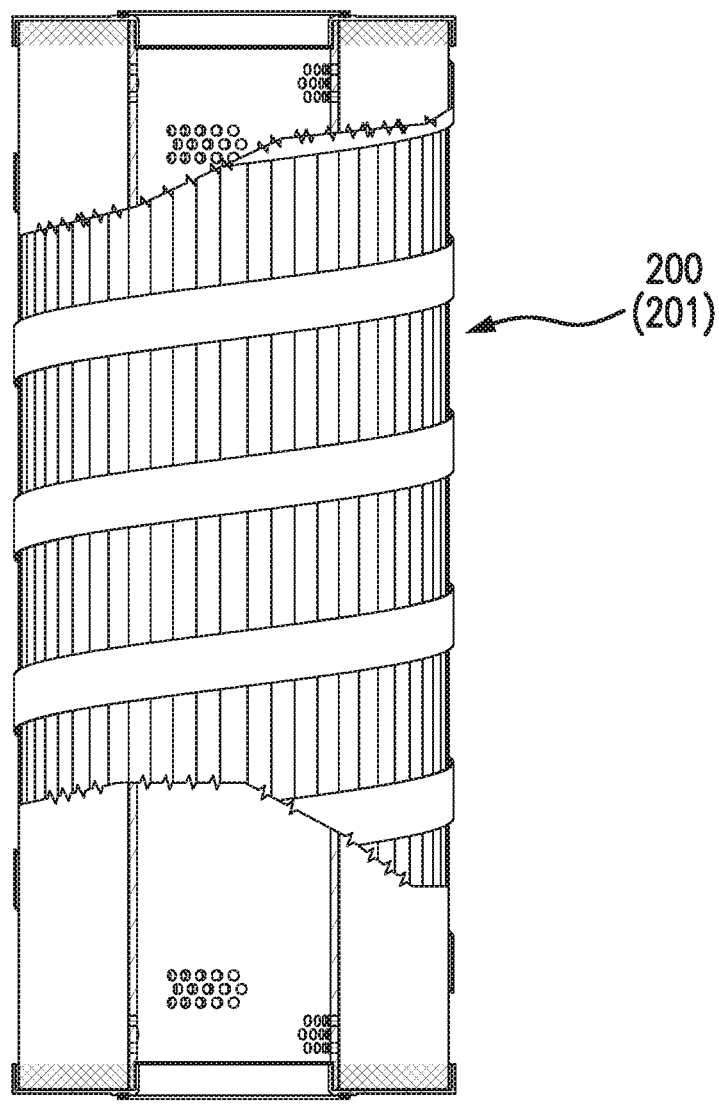

FIG. 3A is an isometric side view of an assembled aircraft fuel ice capturing device comprising the housing and an aircraft fuel filter, showing the aircraft fuel ice capturing device housing top cover, the aircraft fuel inlet, the aircraft fuel outlet, and a portion of the filter; FIG. 3B shows a top perspective view, FIG. 3C shows a top view of the device; FIG. 3D shows a section view along line A-A of FIG. 3C; FIG. 3E shows a section view along line C-C of FIG. 3D, also showing hollow cylindrical aircraft fuel filter is a pleated filter; and FIG. 3F shows a side partially cut away view of the filter, also showing an inner core and an outer wrap.

Figure 4A:
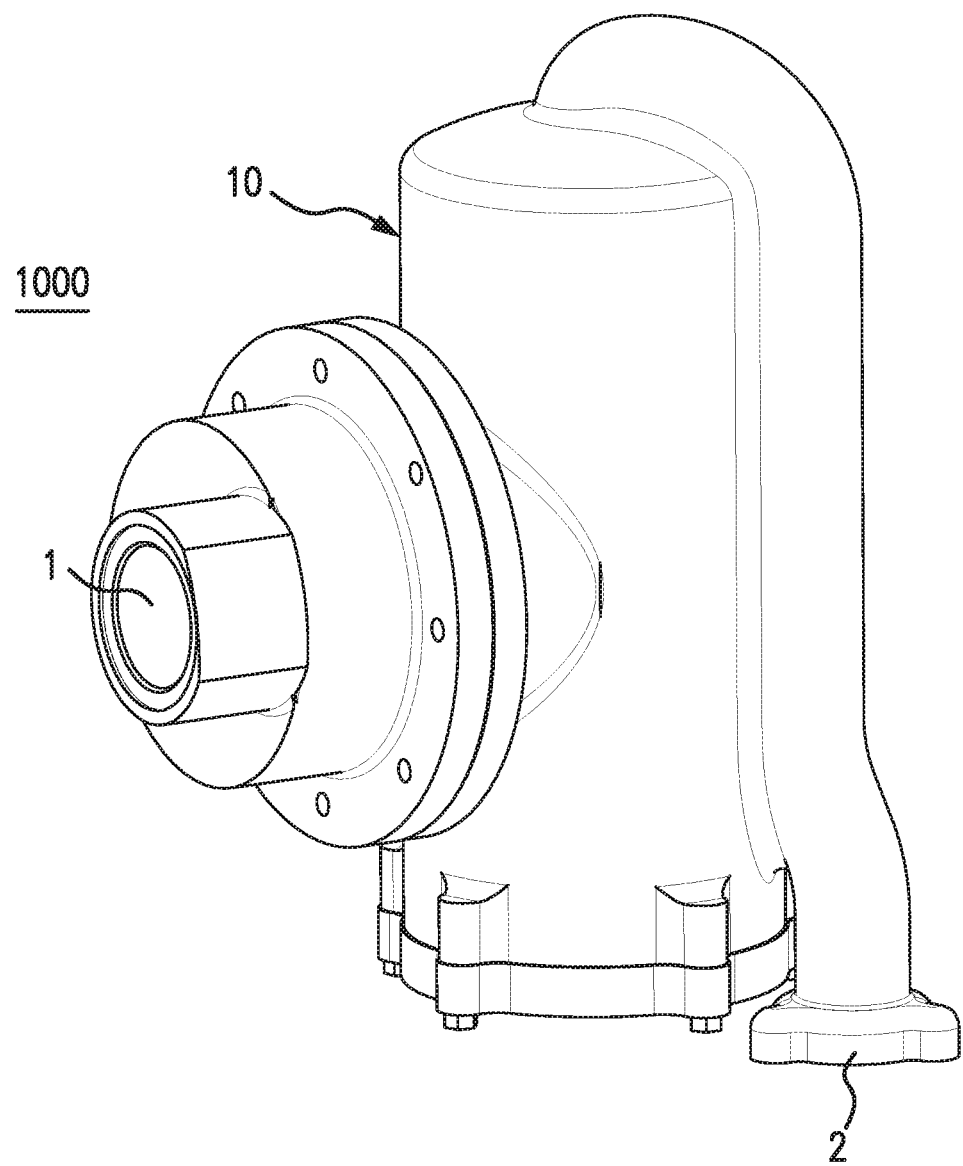
Figure 4B:
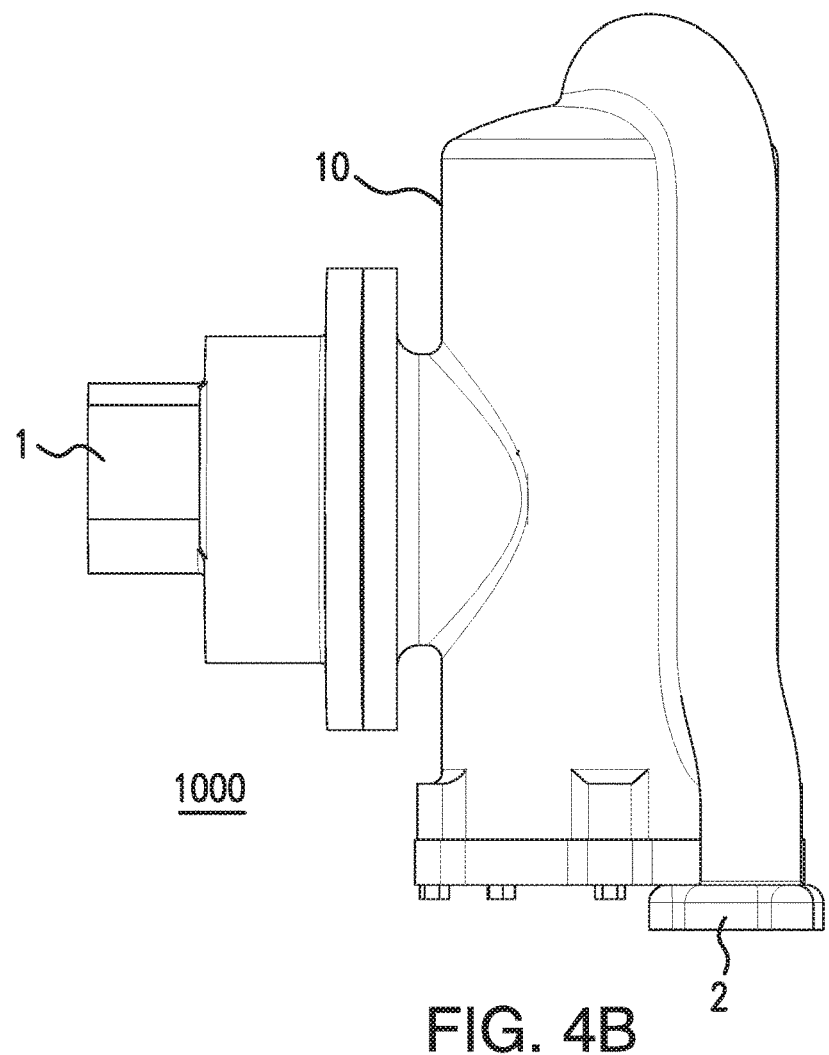
Figure 4C:
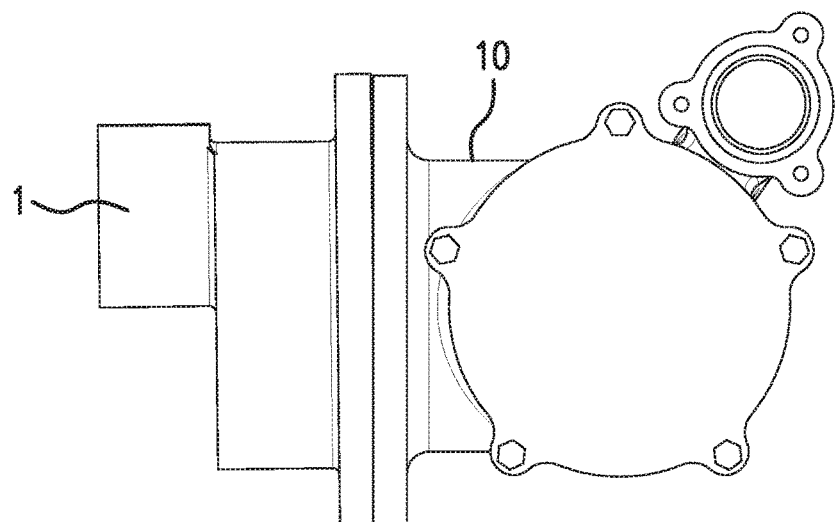

FIGS. 4A-4C are external views of another aircraft fuel ice capturing device, also showing the aircraft fuel inlet and the aircraft fuel outlet. FIG. 4A is an isometric side view; FIG. 4B is a front view; and FIG. 4C is a bottom view.

DETAILED DESCRIPTION OF THE INVENTION

An embodiment of the invention provides an aircraft fuel ice capturing filter device housing comprising (a) an aircraft fuel inlet; (b) an aircraft fuel outlet; (c) a main housing body receiving a flow of aircraft fuel from the aircraft fuel inlet, the main housing body comprising a cylindrical element having a central cavity, an inner surface, an outer surface, a vertical axis; and, plurality of spaced-apart ice-capturing filters on the inner surface, each of the plurality of spaced-apart ice-capturing filters having a front end, a rear end, a top wall, a first side, a second side, an open bottom, and a plurality of apertures passing through the top wall, wherein the top wall at the front end of each of the plurality of spaced-apart ice-capturing filters is raised a distance from the inner surface of the cylindrical element, forming an opening arranged normal to aircraft fuel flow; wherein the aircraft fuel inlet is arranged generally perpendicular to the vertical axis of the cylindrical element and is configured to provide tangential aircraft fuel flow around the cylindrical element; and, wherein the cylindrical element is configured to receive an aircraft fuel filter comprising a porous aircraft fuel filter element.

An aircraft fuel ice capturing filter device according to an embodiment of the invention comprises an embodiment of the aircraft fuel ice capturing filter device housing, wherein the aircraft fuel inlet and the aircraft fuel outlet define a fluid flow path though the aircraft fuel ice capturing filter device housing, and the aircraft fuel ice capturing filter device further comprises an aircraft fuel filter comprising a porous aircraft fuel filter element arranged in the housing across the fluid flow path.

An embodiment of the invention provides an aircraft fuel ice capturing filter device comprising an aircraft fuel ice capturing filter device housing comprising (a) an aircraft fuel inlet; (b) an aircraft fuel outlet; (c) a main housing body receiving a flow of aircraft fuel from the aircraft fuel inlet, the main housing body comprising a cylindrical element having a central cavity, an inner surface, an outer surface, a vertical axis; the cylindrical element having a plurality of spaced-apart ice-capturing filters, each of the plurality of spaced-apart ice-capturing filters having a front end, a rear end, a top wall, a first side, a second side, a bottom opening, and a plurality of apertures passing through the top wall, wherein the top wall at the front end of each of the plurality of spaced-apart ice-capturing filters is raised a distance from the inner surface of the cylindrical element, forming an opening arranged normal to aircraft fuel flow; wherein the aircraft fuel inlet is arranged generally perpendicular to the vertical axis of the cylindrical element and is configured to provide tangential aircraft fuel flow around the cylindrical element; and, an aircraft fuel filter comprising a porous aircraft fuel filter element arranged in the housing.

In accordance with another embodiment of the invention, a method for filtering aircraft fuel is provided, the method comprising passing aircraft fuel through an embodiment of the aircraft fuel ice capturing filter device, wherein a portion of the aircraft fuel passes through the apertures of the plurality of spaced-apart ice-capturing filters.

In a preferred embodiment of the method, the aircraft fuel includes ice, and the method includes capturing ice in the plurality of spaced-apart ice-capturing filters.

In some embodiments of the method, the method further includes passing melted ice through the outlet of the aircraft fuel ice capturing filter device.

Advantageously, smaller filters and filter devices can be utilized since the filters do not need to be designed for ice holding capacity, thus providing for a reduced footprint and reduced weight.

Filters and filter devices according to the invention capture ice under multiple conditions, including the current industry standard, Aircraft Fuel System and Component Icing Test SAE ARP1401B (Jun. 6, 2012), including the water concentration tests "Emergency System Operation" at 288 ppm total water, and "Filter with Bypass Function Operation" which is 2 cc/gallon above water saturation at 85±5° F.

Each of the components of the invention will now be described in more detail below, wherein like components have like reference numbers.

FIG. 1A shows an embodiment of the aircraft fuel ice capturing device housing 1000 including an aircraft fuel inlet 1; an aircraft fuel outlet 2 (shown in FIG. 3A); and a main housing body 10 comprising a plurality of spaced-apart ice-capturing filters 100 arranged on the main housing body (FIG. 1B shows a main housing body without the ice-capturing filter; FIG. 1C shows an aircraft fuel ice capturing device 2000 comprising the housing 1000 containing an aircraft fuel filter 200 and aircraft fuel filter element 201). The main housing is adapted for receiving a flow of aircraft fuel from the aircraft fuel inlet, wherein the main housing body (or bowl) 10 comprises a cylindrical element having a central cavity 11, an inner surface 12, an outer surface 13, and a vertical axis A-A.

As will be discussed in more detail below with respect to FIGS. 2B and 2C, the associated portions of the inner surface 12 of the main housing body 10 at the bottom of the ice filters provide the bottoms of the ice capture filters 100, such that ice capture pockets 102 are provided.

The aircraft fuel inlet 1 (including a cut out providing a port passing through the inner surface 12) is arranged generally perpendicular to the vertical axis of the cylindrical element and is configured to provide tangential aircraft fuel flow around the inner surface of the cylindrical element; and, wherein the cylindrical element is configured to receive an aircraft fuel filter 200 comprising a porous aircraft fuel filter element 201 to provide an aircraft fuel ice capturing device 2000 (see FIGS. 1C, 3D, and 3E).

In some embodiments, the aircraft fuel inlet 1 is configured to provide tangential aircraft fuel flow around the inner surface of the cylindrical element of at least about 0.55 m/s when the tangential fuel inlet inner diameter is about 2 inches. As would be recognized by one of skill in the art, smaller aircraft engines normally have lower fuel flow rates and inlet diameters would decrease to minimize the size and weight of the system. Advantageously, the tangential flow at the inlet imparts a high velocity fluid rotation, forcing the aircraft fuel to the inner surface 12 of the cylindrical element. Since ice and water have a higher density than that of aircraft fuel, the tangential flow at the inlet allows for centrifugal separation of the ice/water from the aircraft fuel.

As shown in FIGS. 2A-2C, each of the plurality of spaced-apart ice-capturing filters 100 is arranged on the inner surface of the main housing body, and each ice filter has a front end 105, a rear end 106, a top wall 107, a first side 108A, a second side 108B, and a bottom 101 formed by inner surface 12, and a plurality of apertures 110 passing through at least the top wall (in these Figures the apertures also pass through the rear end, and in some embodiments (not shown) through the first and second sides), wherein, as shown particularly in FIGS. 2B and 2C, the top wall at the front end of each of the plurality of spaced-apart ice-capturing filters face is raised a distance from the inner surface 12 of the main housing body 10, forming an opening 102A arranged normal to incoming aircraft fuel flow.

Typically, individual ice-capturing filters have a minimum length (from front end 105 to rear end 106) of about 0.23 inches (about 5.8 mm), a minimum height (from surface 12 to the front end 105 of the top wall 107) of about 0.23 inches (about 5.8 mm), and a minimum width (from the first side 108A to the second side 108B) of about 0.26 inches (about 6.6 mm). Typically, the opening 102A is at least about 0.20 inches (about 5 mm).

The individual ice-capturing filters are spaced apart. As a result, flow enters the housing and is split into areas with ice capture and without ice capture. Areas without ice capture devices will reduce changes in velocity as the flow spins tangentially around the inside of the cylindrical element. Spacing the ice-capturing filters apart at the upper part of the housing also avoids ice bridging between ice-capturing filters which could block fuel flow.

Preferably, individual ice-capturing filters have a maximum height based on a predetermined gap G (see FIG. 3E) between the aircraft fuel filter outside diameter (OD) and the cylindrical element inside diameter (ID), assuming that the aircraft fuel filter is concentric with the cylindrical element ID. Illustratively, if the cylindrical element ID is 4 inches (about 102 mm), and the aircraft fuel filter OD is 3.5 inches (about 89 mm), the maximum ice filter height should be about 0.25 inches (about 6 mm) to prevent interference.

The presence of apertures 110 in each ice filter minimizes stagnation pressure at the aircraft fuel inlet 1. While FIG. 2A illustrates the apertures as annular in shape, and arranged in parallel horizontal rows, the apertures can have other shapes and be arranged in other configurations. For example, the apertures can be oval in shape, and with the ovals arranged vertically, horizontally, or at an angle. An individual aperture can extend from the front end to the rear end or from the first side to the second side. The filters can have apertures with combinations of shapes. Typically, an individual aperture has a diameter in the range of about 0.06 inches (about 1.5 mm) to about 0.12 inches (about 3 mm). The depth of the individual apertures is typically equal to the thickness of the walls, e.g., in the range of from about 0.04 inches (about 1 mm) to about 0.25 inches (about 6 mm).

An aircraft fuel filter 200 and aircraft fuel filter element 201 can have any suitable pore structure, e.g., a pore size (for example, as evidenced by bubble point, or by KL as described in, for example, U.S. Pat. No. 4,340,479, or evidenced by capillary condensation flow porometry), a pore rating, a pore diameter (e.g., when characterized using the modified OSU F2 test as described in, for example, U.S. Pat. No. 4,925,572), or removal rating that reduces or allows the passage therethrough of one or more materials of interest as the fluid is passed through the element.

The aircraft fuel filter can include additional elements, layers, or components, that can have different structures and/or functions, e.g., at least one of any one or more of the following: prefiltration, support, drainage, spacing and cushioning. Illustratively, the aircraft fuel filter can also include at least one additional element such as a core, mesh and/or a screen. In the embodiment shown in FIG. 3F, the filter has an inner core and an outer wrap.

In accordance with embodiments of the invention, the aircraft fuel filter comprises at least one porous aircraft fuel filter element. The aircraft fuel filter element typically comprises a fibrous medium. The aircraft fuel filter and/or the aircraft fuel filter element can have a variety of configurations, including pleated, and hollow cylindrical. In one preferred embodiment, as shown in FIGS. 3D-3F the aircraft fuel filter has a hollow cylindrical pleated configuration.

Any housing of suitable shape, providing an inlet and an outlet and a cavity for an aircraft fuel filter may be employed. FIGS. 3A, 3B, and 4A-4C illustrate a variety of housings.

Each of the housings has, as described with respect to the embodiment shown in FIGS. 1A and 3A, an aircraft fuel inlet; and an aircraft fuel outlet; and a main housing body comprising a cylindrical element comprising a plurality of spaced-apart ice-capturing filters (as described above, e.g., with respect to FIG. 1A), wherein the aircraft fuel inlet is arranged generally perpendicular to the vertical axis of the cylindrical element and is configured to provide tangential aircraft fuel flow around the inner surface of the cylindrical element, and an aircraft fuel filter comprising a porous aircraft fuel filter element can be arranged in the central cavity of the housing.

Using FIGS. 3A-3F for reference, an aircraft fuel filter 200 is disposed in the aircraft fuel ice capturing device housing 1000 within the cavity 11, the housing 1000 comprising the inlet 1 and the outlet 2 and defining an aircraft fuel fluid flow path between the inlet and the outlet, wherein the aircraft fuel filter 200 is across the aircraft fuel fluid flow path, to provide an aircraft fuel ice filter device 2000.

The housing can be fabricated from any suitable rigid impervious material, which is compatible with the aircraft fuel being filtered. For example, the housing can be fabricated from a metal, such as aluminum, magnesium, stainless steel, or from a composite including metal. If desired, the housing can be manufactured by, for example, casting, additive manufacturing, extrusion, and light polymerization.

For example, the housing can monolithic, manufactured via additive manufacturing (sometimes referred to as "additive layer manufacturing" or "3D printing"), typically formed by repeated depositions of a metal powder bound together with an activatable binder (e.g., binder jetting, sometimes referred to as "drop on powder"), typically followed by agglomerating the powder, e.g., by sintering. Other suitable methods include extrusion (e.g., paste extrusion, fused filament fabrication and fused deposition modelling) and light polymerization (e.g., stereolithography apparatus (SLA), and digital light processing (DLP)).

Any suitable additive manufacturing equipment can be used, and a variety of production 3D printers are suitable and commercially available.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An aircraft fuel ice capturing filter device housing comprising:
 (a) an aircraft fuel inlet;
 (b) an aircraft fuel outlet; and
 (c) a main housing body receiving a flow of aircraft fuel from the aircraft fuel inlet, the main housing body comprising a cylindrical element having a central cavity, an inner surface, an outer surface, and a vertical axis; the cylindrical element having a plurality of spaced-apart ice filters on the inner surface, each of the plurality of spaced-apart ice filters having a front end, a rear end, a top wall, a first side, and a second side, and a plurality of apertures passing through the top wall, wherein the top wall at the front end of each of the plurality of spaced-apart ice filters is raised a distance from the inner surface, forming an opening arranged normal to aircraft fuel flow;

wherein the aircraft fuel inlet is arranged generally perpendicular to the vertical axis of the cylindrical element and is configured to provide tangential aircraft fuel flow around the cylindrical element; and, wherein the cylindrical element is configured to receive an aircraft fuel filter comprising a porous element.

2. An aircraft fuel ice capturing filter device comprising:

the aircraft fuel ice capturing filter device housing according to claim 1; and, an aircraft fuel filter comprising a porous aircraft fuel filter element arranged in the aircraft fuel ice capturing filter device housing.

3. A method of filtering aircraft fuel, the method comprising passing aircraft fuel through the aircraft fuel ice capturing filter device according to claim 2.

4. The method of claim 3, wherein the aircraft fuel includes ice, and the method includes capturing ice in the plurality of spaced-apart ice-capturing filters and allowing a portion of aircraft fuel to pass through the plurality of spaced-apart ice-capturing filters.

5. The method of claim 4, further comprising passing melted ice through an outlet of the aircraft fuel ice capturing filter device.

6. The method of claim 3, further comprising passing melted ice through an outlet of the aircraft fuel ice capturing filter device.

* * * * *